United States Patent [19]

Kelch

[11] 4,209,688
[45] Jun. 24, 1980

[54] ELECTRONIC TAXIMETER ASSEMBLY

[75] Inventor: Heinz Kelch, Buchenberg, Fed. Rep. of Germany

[73] Assignee: Kienzle Apparate GmbH, Villingen, Fed. Rep. of Germany

[21] Appl. No.: 870,130

[22] Filed: Jan. 17, 1978

Related U.S. Application Data

[63] Continuation of Ser. No. 585,293, Jun. 9, 1975, abandoned.

[30] Foreign Application Priority Data

Jun. 11, 1974 [DE]  Fed. Rep. of Germany ....... 2428075

[51] Int. Cl.² .......................................... G07B 13/00
[52] U.S. Cl. ................................... 235/30 R; 235/45
[58] Field of Search .................. 235/10, 30 R, 33 R, 235/45, 32, 34; 73/431; 361/350, 351, 358, 360, 390, 392, 393, 394

[56] References Cited

U.S. PATENT DOCUMENTS

| | | | |
|---|---|---|---|
| 2,544,761 | 3/1951 | Kilminster | 361/350 |
| 2,596,164 | 5/1952 | Palmer | 235/30 R |
| 2,650,757 | 9/1953 | Weisinger | 235/30 R |
| 2,731,555 | 1/1956 | Beck | 361/394 |
| 3,137,212 | 6/1964 | Rose | 361/394 |
| 3,860,806 | 1/1975 | Fichter et al. | 235/30 R |

*Primary Examiner*—Vit W. Miska
*Attorney, Agent, or Firm*—Toren, McGeady and Stanger

[57] ABSTRACT

The housing of an electronic taximeter has a first fixed section including the rear and bottom walls which are fixedly secured to and sealed to the chassis of a taxicab, and a removable second section which may include the front, top and side walls of the housing and has grooves engaging portions of the bottom wall. The entire second section removable to enable adjustment or repair of the basic taximeter apparatus which is mounted on the first section. The second section is formed as a modular element which contains many of the operating elements of the taximeter, including actuating elements such as push-buttons or the like, all of which may be simply removed as a one-piece unit. The invention is particularly adapted for use as an electronic taximeter which may be conveniently formed as two separable modular units each containing operating elements of the taximeter which cooperate with each other when the taximeter is assembled but which, nevertheless, need not be removed from the individual modular section upon which they are operatively mounted when the first and second modular sections are separated.

6 Claims, 4 Drawing Figures

ELECTRONIC TAXIMETER ASSEMBLY

This is a continuation of application Ser. No. 585,293, filed on June 9, 1975, abandoned.

BACKGROUND OF THE INVENTION

The present invention relates to taximeters in general, and more particularly to improvements in housings for electronic taximeters.

Taximeters for use in vehicles for hire are known for more than a century. As a rule, a taximeter is fixedly secured to the chassis of the vehicle and is sealed to the chassis by an official of the bureau of standards or by another authorized person to thus prevent tampering with component parts which compute the fare. The means for computing the fare is operatively connected with a shaft which is driven by a wheel or another moving part of the vehicle to furnish information pertaining to mileage. Furthermore, the fare computing means is connected with a clockwork which furnishes information pertaining to the period during which the taximeter is in operation and/or to waiting times.

The taximeter must or should be mounted in or on the vehicle in such a position that the fare indicator can be observed by the passenger(s). This created problems with older types of relatively bulky taximeters because they occupied so much room that, when installed in front of the front passenger seat, they interfered with freedom of movement of the passenger sitting next to the driver and they also presented a serious hazard in the event of an accident. Moreover, the vision of such passenger was obstructed because the older types of taximeters were mounted on the dashboard so that they covered a substantial part of the windshield.

It was thereupon proposed, and it is still customary, to install the taximeter between the driver and the seat for the front passenger. Such mounting of the taximeter eliminates several problems; however, the windows of the taximeter cannot be readily observed by the passenger or passengers occupying the back seat of the vehicle. Furthermore, such mounting of the taximeter is impractical because the entire taximeter must be removed, and the seal or seals connecting its housing to the chassis destroyed, when a mechanic is to gain access to such components of the vehicle which are located immediately below the dashboard. Such components include the transmission and the clutch.

It was further proposed to greatly reduce the size of the taximeter housing so that it can be readily installed directly in the dashboard, e.g., in the space normally occupied by the glove compartment. This solution is eminently satisfactory for a number of reasons, i.e., the taximeter is not in the way of the passenger occupying the seat next to the driver, the fare can be observed by all passengers, the taximeter does not represent a hazard in the event of an accident, and practically all component parts of the vehicle can be reached without necessitating even partial dismantling of the taximeter. Nevertheless, such types of taximeters still exhibit certain serious drawbacks (which are shared by the previously described earlier types). Thus, any adjustments of the basic taximeter apparatus in the interior of the housing invariably necessitates complete detachment of the housing from the chassis of the vehicle because the basic apparatus can be reached only when the housing is separated from the conveyance. The detachment of taximeter housing from the chassis must be preceded or followed by separation of various connections between the vehicle and the basic taximeter apparatus, such as conductors connecting an electronic taximeter apparatus with the battery or generator; conduits, shafts or conductors connecting the apparatus with distance indicating means, conductors connecting the apparatus with the roof light or lights, and/or others. Thus, each and every adjustment of the basic taximeter apparatus is a tedious, time-consuming and complex procedure which invariably necessitates the destruction of aforementioned seals. Consequently, the presence of a representative of competent authorities is required for each adjustment of a conventional taximeter or, at the very least, for long-lasting renewed installation of adjusted taximeters in the vehicles.

SUMMARY OF THE INVENTION

An object of the invention is to provide a novel and improved taximeter which is constructed and assembled in such a way that any and practically all adjustments or repairs of its basic apparatus can be carried out while the apparatus and a substantial portion of the housing remain attached and sealed to the vehicle, e.g., to the chassis of a taxicab.

Another object of the invention is to provide a novel and improved composite housing particularly suitable for use in an electronic taximeter.

A further object of the invention is to provide a novel and improved connection between the separable sections of a taximeter housing.

An additional object of the invention is to provide a taximeter whose basic apparatus can be reached without necessitating destruction of seals which secure the taximeter to the chassis of a vehicle and without necessitating the disconnection of basic apparatus from mechanical and/or electrical connections with certain component parts of the vehicle.

Still another object of the invention is to provide a taximeter wherein the repairs and/or adjustments of basic apparatus take up a small fraction of the time which is needed for such operations in connection with conventional taximeters.

The invention is embodied in a taximeter assembly which comprises a novel and improved housing basically composed of a first section and a second section each formed as a modular unit containing operative components of the taximeter which operatively engage when the two sections are joined together but which, nevertheless, need not be separated from the individual section upon which they are mounted when the modular sections are disassembled to enable servicing of the taximeter component parts. The taximeter assembly includes means for fixedly securing the first section to the chassis of an automotive vehicle and removable fastener means for detachably securing the second section to the first section. The overall taximeter assembly is formed with a box-like outer configuration, but is conveniently arranged so that the bottom wall and rear wall of the assembly are formed as part of the first, fixed modular section, with the front or visible wall being formed as part of the second or removable modular section. The second section is detachable from and attachable to the first section, upon removal of the fastener means, by respectively shifting the front wall in directions away from and toward the rear wall. Still further, the taximeter comprises a basic taximeter apparatus (e.g., an electronic apparatus) which is disposed in the housing and is secured to the first section, at least one first coupling means provided in the first section (such coupling means may include one or more sockets), and conductor means having second coupling means complementary to and connected with the first coupling means. The second coupling means may constitute one or more plugs, and the conductor means may serve to connect the basic apparatus with an energy source, with a mileage indicator and with the lamp or lamps on the roof of the vehicle. The basic apparatus in the housing may include at least one interchangeable tariff schedule determining element (preferably a module) which is accessible for replacement with a different element upon detachment of the second section from the first section.

Among the significant features of the invention there is included mounting of operative elements of the taximeter upon the front wall in a manner which does not necessitate disassembly thereof from the front wall during servicing. Among the operative elements attached to the front wall are actuating elements, such as pushbuttons or the like, which serve to actuate and operate electronic equipment mounted in the first modular section and comprising the basic electronic computation apparatus performing the basic taximeter computing functions. Such actuating elements may remain in mounted engagement in operative position upon the front panel or wall even when the first and second modular units are separated. Thus, the entire assembly may be operatively arranged as two basic parts which may be simply and conveniently separated to enable servicing of the equipment without requiring further complicated procedures.

The novel features which are considered as characteristic of the invention are set forth in particular in the appended claims. The improved taximeter itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 3:
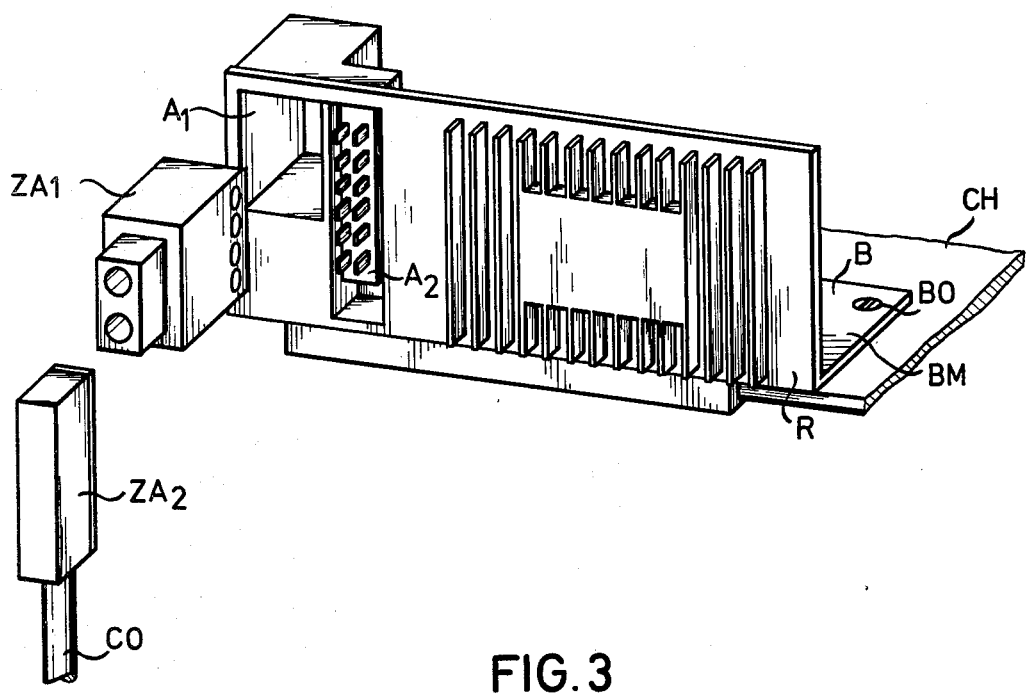
FIG. 3 is a perspective view of the rear side of the first housing section.

The taximeter which is shown in the drawing comprises a prismatic housing which is basically composed of two modular units or sections $G_1$ and $G_2$, the section $G_1$ being a fixed section and the section $G_2$ being a removable section. The section $G_1$ has two walls, namely a bottom wall B and a rear wall R. The section $G_2$ includes four walls, namely a top wall T, a front wall F, and two side walls SW. The rear wall R and/or the bottom wall B is fixedly secured to the chassis or frame CH (FIG. 3) of an automotive vehicle, e.g., a taxicab.

The means for fixedly securing the section $G_1$ to the frame CH includes screws BO (only one shown in FIG. 3) or analogous fasteners. At least one such fastener means is provided with seal (not shown) which is applied by the bureau of standards, by the private owner of the vehicle, or by the taxi fleet owner.

The rear or outer side of the rear wall R has two or more coupling elements here shown as sockets $A_1$ and $A_2$ (FIG. 3) which can receive complementary coupling elements or plugs $ZA_1$, $ZA_2$, attached to the ends of conductors CO (only one shown) which connect the taximeter with certain units of the automotive vehicle. The contacts or analogous components on the plugs $ZA_1$, $ZA_2$ and/or in the sockets $A_1$, $A_2$ are connected with the basic taximeter apparatus TW which is installed in the interior of the housing and the exact details of which form no part of the present invention. The plug $ZA_1$ has contacts which transmit to the basic apparatus TW signals indicating the mileage, and the plug $ZA_2$ connects the basic apparatus with a source of electrical energy. The rear wall R is normally provided with one or more additional sockets for plugs secured to conductor means connecting the basic apparatus TW with the box on the roof of the vehicle so that the box can illuminate an "occupied" or a "vacant" sign.

Figure 1:
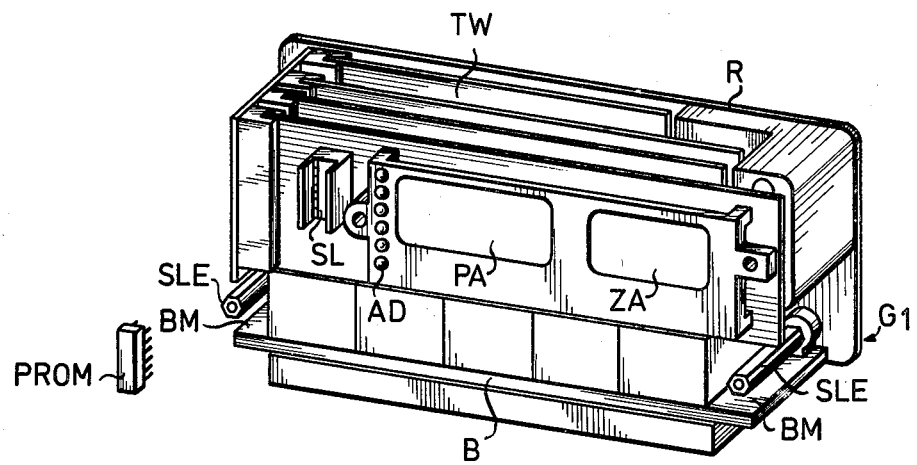
FIG. 1 is a perspective view of the front side of the first fixed modular housing section showing the basic electronic apparatus mounted therein.

The basic taximeter apparatus TW is preferably secured to the wall B and/or R of the housing section $G_1$ (see FIG. 1). The illustrated basic taximeter apparatus is assumed to be an electronic apparatus, i.e., an apparatus which does not have any moving parts such as bearings, shafts, mechanical clockwise, gears, wheels, and others. The step-up and step-down transmissions, the counters, the clockwork and other elements of the basic apparatus TW are electronic components. However, it should be noted that all of the basic electronic components are mounted in the first or fixed modular section $G_1$ and that all of the socket means for the assembly, such as the sockets $A_1$, $A_2$ for receiving input means, such as the plugs $ZA_1$ and $ZA_2$, are also all located in the fixed section $G_1$.

Figure 2:
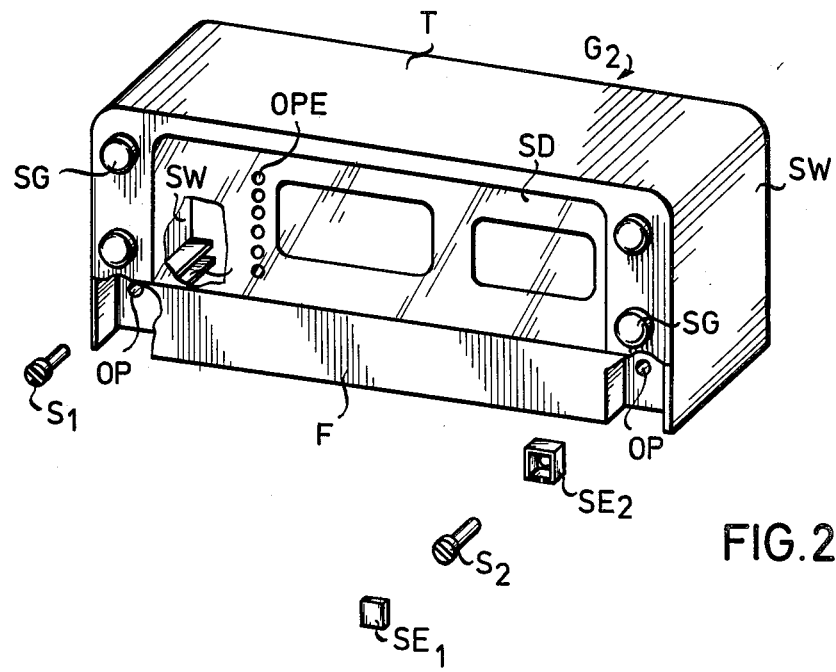
FIG. 2 is a perspective view of the second or removable modular housing section, with portions broken away.

An important feature of the housing including the sections $G_1$ and $G_2$ is that it affords convenient access to the basic apparatus TW with little loss in time and by resorting to rudimentary tools. This will be necessary when the basic apparatus TW requires repair or when the basic apparatus must be adapted to different tariffs. All that is necessary to reach the basic apparatus TW is to remove the section $G_2$ while the section $G_1$ remains fixedly secured and sealed to the frame CH. As shown in FIG. 2, the lower portions of the side walls SW of the housing section $G_2$ have elongated grooves or channels N (only one shown) which can receive and guide the respective marginal portions BM of the bottom wall B. The provision of guide grooves N facilitates the work of the operator by enabling him to steer the section $G_1$ to and from its normal position (in which the housing of the taximeter is fully assembled) without jamming or tilting. It will be noted that the sections $G_1$ and $G_2$ can be assembled or taken apart by moving the front wall F of the section $G_2$ toward or away from the rear wall R. Another advantage of the grooves N is that they cooperate with the marginal portions BM to form rudimentary labyrinth seals which reduce the likelihood of penetration of dust and/or other foreign matter into the interior of the housing. Once the section $G_2$ is properly assembled with the section $G_1$, it is removably secured to the section $G_1$ by suitable fastener means. In the illustrated embodiment, the fastener means includes two screws $S_1$, $S_2$ whose shanks can pass through openings OP in the lower portion of the front wall F to enter tapped bores in sleeves SLE extending forwardly from the rear wall R. At least one of the screws $S_1$ and $S_2$ can be sealed in fully inserted position by a sealing device including the parts $SE_1$ and $SE_2$ to reduce the likelihood of unauthorized tampering with the basic apparatus TW.

As a rule, the cost to a passenger is computed on the basis of mileage and on the basis of time. Furthermore, the cost to the passenger(s) often depends on the number of passengers; the basic distance is shortened and/or the basic time unit is made shorter if the driver picks up two or more passengers. The various rates are prescribed by authorities. If such rates are changed, the basic apparatus TW must be adjusted accordingly. In accordance with conventional practice, the adjustment involves the removal of the entire taximeter from the vehicle, dismantling of the housing to gain access to the basic apparatus, and resetting of the basic apparatus. As a rule, the rate-determining electronic or mechanical components are removed and replaced with new components which are calibrated to indicate the newly prescribed rates.

In accordance with the present invention, the adjustment of basic taximeter apparatus TW does not necessitate complete removal of the taximeter from the vehicle. Thus, the housing section $G_1$ (with the basic apparatus mounted thereon) remains affixed and sealed to the frame CH of the vehicle. The person in charge merely destroys the seal $SE_1$, $SE_2$, removes the screws $S_1$, $S_2$ and detaches the housing section $G_2$ by shifting the latter in a direction to move the front wall F away from the rear wall R. The plugs $ZA_1$, $ZA_2$ remain in the respective sockets $A_1$, $A_2$. As shown in FIG. 1, the basic apparatus TW includes (immediately or closely behind the front wall F) a fare indicator PA and an indicator ZA for extra charges (e.g., trunks, night shift, etc. Furthermore, the basic apparatus TW includes a so-called chip PROM which is a highly integrated discrete miniature electronic printed circuit insertable into a socket SL at the front side of the apparatus. This chip is designed to furnish all parameters for calculation of the fare and extra charges. The just mentioned parameters may include the basic charge which appears at PA when the taximeter is started, the charge per unit distance at the start of a trip, the charge per unit distance for further stages of a trip (e.g., rate I, rate II, rate III and rate IV), the charge for prescribed waiting times, and the intervals at which the timer is caused to advance by a step. The electronic computer circuit of the basic apparatus TW receives signals from the corresponding signal storing units of the chip PROM, i.e., from those units which are to furnish signals during a particular phase of a trip to insure proper computation of the fare. The chip PROM is a fixed program "readout only" storage. The socket SL has bars which connect the contacts of the chip PROM with the corresponding components of the basic apparatus TW. The connection between PROM and SL is simple and reliable and can be readily terminated. If the previously used chip PROM is to be replaced with a new chip, the section $G_2$ is detached from the section $G_1$ in the aforementioned manner and the front side of the basic apparatus TW is then fully accessible for substitution of a new chip. The section $G_2$ is thereupon reattached and sealed to the section $G_1$ while the latter (with the basic apparatus TW mounted thereon) remains fixedly secured and sealed to the chassis CH. The official in charge then applies a fresh seal $SE_1$, $SE_2$. The entire operation (i.e., the replacement of an old chip with a new chip), inclusive of dismantling and renewed assembly and sealing of the housing, takes up a surprisingly short period of time and can be effected by resorting to rudimentary tools.

An official who is called to inspect and reseal the taximeter need not waste much time because the seal or seals for the screws BO need not be touched at all and the application of a seal $SE_1$, $SE_2$ or of a portion thereof upon completed insertion of a new chip and reassembly of the housing sections $G_1$ and $G_2$ is a simple and time saving procedure.

As stated above, the exact nature of the basic apparatus in the improved taximeter housing forms no part of the invention. However, it should be understood that the invention is particularly intended for use with a taximeter wherein the apparatus TW is electronic in character, and the invention is considered especially suitable for this purpose.

FIG. 1 further shows that the basic apparatus TW includes a series of lamps AD which can be observed through openings OPE provided in the adjacent portions of the front wall F. The lamps AD form a vertical row adjacent to the left-hand side of the fare indicator PA (e.g., a digital indicator which indicates the fare in dollars and cents). The lighting of selected lamp or lamps AD enables the driver and/or the passenger(s) to observe the condition of the taximeter and the selected rate. Thus, the uppermost lamp AD can indicate that the "vacant" sign is on, the next-to-the-uppermost lamp can indicate that the fare is being computed in accordance with the rate I, the third lamp for the rate II, the fourth lamp for the rate III, the fifth lamp for the rate IV, and the lowermost lamp is on when the taximeter is off, i.e., upon completion of a particular trip.

Figure 4:
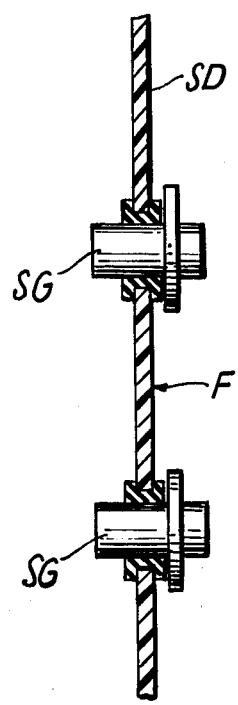
FIG. 4 is a sectional view taken through the front wall of the second housing section shown in FIG. 2 depicting in greater detail the mounting thereon of actuator elements for the taximeter assembly.

The front wall F of the section $G_2$ includes an indicia bearing panel SD having openings OPE and additional openings in register with PA, ZA of the basic apparatus TW, and a transparent panel (not visible) in front of the panel SD. The data on the panel SD can include information pertaining to significance of various lamps AD and others. The panel SD conceals the major part of the basic apparatus TW in the interior of the housing. The front wall F further carries several manually operable actuating elements SG in the form of depressible, rotary or reciprocable knobs, pushbuttons, keys or the like. Portions of these actuating elements extend into the housing through openings provided therefor in the front wall F. One of these knobs may serve to start the taximeter, another to arrest the taximeter, and a third to select the rate. The actuating elements SG can transmit motion to adjacent pushbuttons, rotary knobs, levers or other movable parts in the interior of the housing. In order to reduce the likelihood of penetration of dust or other foreign matter into the housing, the actuating elements SG are preferably permanently mounted and sealed in the front wall F in a manner shown in greater detail in FIG. 4, i.e., they are movable toward or away from the rear wall R during attachment or detachment of the section $G_2$.

At least one of the housing sections $G_1$, $G_2$ preferably consists of a suitable synthetic plastic material and may be produced by resorting to a suitable injection molding technique. Furthermore, the improved housing can be modified in a number of ways without departing from the purview of the invention. For example, the section $G_1$ may include a single wall (R or B) or the section $G_2$ may include only the walls F and SW (in the first case, the wall B or R forms part of the section $G_2$ and, in the second case, the wall T forms part of the section $G_1$). All that counts is to construct the housing in such a way that one of its sections (with the basic apparatus mounted thereon) remains attached and sealed to the frame CH when the housing is being taken apart in order to effect necessary repairs or adjustments.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. An electronic taximeter assembly consisting essentially of a first modular section and a second modular section detachably secured to said first modular section, said modular sections being structured to form for said assembly an external enclosure consisting of two constituent parts, one of said parts being structured as part of said first modular section and the other of said parts being structured as part of said second modular section, said external enclosure comprising a front wall, a side wall, a rear wall and a bottom wall, with at least one of said rear wall and said bottom wall being formed as part of said first modular section, and with at least said front wall and said side wall being formed as part of said second modular section, said assembly further comprising electronic taximeter computation apparatus including electronic elements for performing basic taximeter computing functions mounted as a part of said first modular section; means for nondetachably securing said first modular section in operative position within a taxi through connection with at least one of said rear wall and said bottom wall; socket means located in at least one of said rear wall and said bottom wall for enabling connection of said electronic computation apparatus with electrical energy supply means and with input means for supply to said computation apparatus of information forming the basis for performance of said basic taximeter computing functions by said electronic taximeter computation apparatus; manually operable actuating means nondetachably secured in at least one of said front wall and said side wall of said second modular section in operative arrangement for enabling desired actuation of said electronic taximeter computation apparatus; and detachable fastener means for detachably securing said second modular section in operative engagement on said first modular section with said actuating means positioned to enable actuation of said computation apparatus; said second modular section being structured to be removed as a unit from said first modular section with said actuating means remaining mounted on said second modular section so that they may be returned to operative position relative to said computation apparatus merely by reattachment of said second section to said first section; the overall arrangement of said assembly being such that removal of said second section from said first section operates to permit access to said electronic taximeter computation apparatus to enable servicing thereof without further disassembly of parts.

2. An assembly according to claim 1 wherein said first modular section includes a side thereof lying adjacent said front wall of said second modular section when said sections are in assembled condition, said electronic taximeter computation apparatus including at least one interchangeable tariff schedule determining element which is plugged into said first modular section in said side adjacent said front wall to facilitate removal and replacement thereof upon detachment of said second modular section from said first modular section.

3. An assembly according to claim 1 wherein both said bottom wall and said rear wall of said external enclosure are formed as part of said first modular section and wherein said bottom wall has connected therethrough said nondetachably securing means for connecting said first modular section with said taxi.

4. An assembly according to claim 3 wherein said external enclosure is formed to include a top wall and two side walls each formed in a unitary manner together with said front wall as part of said second modular section.

5. An assembly according to claim 3 wherein said socket means are located in said rear wall.

6. Apparatus according to claim 1, wherein said bottom wall includes outer marginal portions and wherein said second modular section includes grooves arranged to extend in sliding engagement with said marginal portions of said bottom wall to guide movement of said second modular section relative to said first modular section during attachment and detachment thereof, said marginal portions of said bottom wall and said grooves forming a rudimentary labyrinth seal tending to impede the entry of deleterious material into said assembly during operation thereof.

* * * * *